United States Patent
Kishi et al.

(10) Patent No.: US 9,641,507 B2
(45) Date of Patent: *May 2, 2017

(54) VIRTUAL AVATAR AUTHENTICATION

(71) Applicant: International Business Machines Corporation, Armonk, NY (US)

(72) Inventors: Gregory T. Kishi, Oro Valley, AZ (US); James G. McLean, Raleigh, NC (US); Clifford A. Pickover, Yorktown Heights, NY (US); Daniel J. Winarski, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/670,291

(22) Filed: Mar. 26, 2015

(65) Prior Publication Data

US 2015/0200929 A1 Jul. 16, 2015

Related U.S. Application Data

(63) Continuation of application No. 13/364,163, filed on Feb. 1, 2012, now Pat. No. 9,009,846.

(51) Int. Cl.
G06F 21/24 (2006.01)
H04L 29/06 (2006.01)
G06F 21/44 (2013.01)

(52) U.S. Cl.
CPC ............ *H04L 63/08* (2013.01); *G06F 21/445* (2013.01); *H04L 63/102* (2013.01)

(58) Field of Classification Search
CPC ...... G06F 21/445; H04L 63/08; H04L 63/102
See application file for complete search history.

(56) References Cited

U.S. PATENT DOCUMENTS 7,516,220 B1 4/2009 Stiert
9,009,846 B2 4/2015 Kishi et al.
(Continued)

FOREIGN PATENT DOCUMENTS

CN 101622620 A 1/2010
CN 102136269 A 7/2011
(Continued)

OTHER PUBLICATIONS

Office Action from Chinese Application No. CN201310041035.5, dated May 28, 2015.
(Continued)

*Primary Examiner* — Saleh Najjar
*Assistant Examiner* — Devin Almeida
(74) *Attorney, Agent, or Firm* — Zilka-Kotab, PC (57) ABSTRACT

In one general embodiment, a method for determining a controlling entity of a first avatar in a virtual world includes: receiving a request for access to a resource via a first avatar; providing a challenge to the first avatar in response to receiving the request; receiving a challenge response via the first avatar in response to the challenge; determining an identity confidence level based on the challenge response; making an identity determination for a controlling entity of the first avatar based on the identity confidence level; and providing or denying access to the resource based on the identity determination.

20 Claims, 3 Drawing Sheets

(56) References Cited

U.S. PATENT DOCUMENTS

| | | | |
|---|---|---|---|
| 2005/0125339 A1* | 6/2005 | Tidwell | G06Q 20/042 705/39 |
| 2009/0165085 A1* | 6/2009 | Naka | G06F 21/32 726/2 |
| 2010/0037147 A1* | 2/2010 | Champion | G06F 21/316 715/751 |
| 2010/0162404 A1 | 6/2010 | Dawson et al. | |
| 2010/0253471 A1* | 10/2010 | Abe | G06F 21/32 340/5.83 |
| 2010/0315201 A1* | 12/2010 | Hirata | G06F 21/32 340/5.82 |
| 2011/0029781 A1 | 2/2011 | Clark et al. | |
| 2011/0150267 A1 | 6/2011 | Snelling et al. | |
| 2011/0209076 A1 | 8/2011 | Saxena et al. | |
| 2013/0198861 A1 | 8/2013 | Kishi et al. | |

FOREIGN PATENT DOCUMENTS

| | | | |
|---|---|---|---|
| JP | 2005128820 A | 5/2005 | |
| JP | 2006006473 A | 1/2006 | |
| JP | 2007175504 A | 7/2007 | |

OTHER PUBLICATIONS

Notice of Allowance from U.S. Appl. No. 13/364,163, dated Dec. 5, 2014.

Non-Final Office Action from U.S. Appl. No. 13/364,163, dated Aug. 16, 2013.

Final Office Action from U.S. Appl. No. 13/364,163, dated Mar. 18, 2014.

Advisory Action from U.S. Appl. No. 13/364,163, dated Jun. 4, 2014.

Kishi et al., U.S. Appl. No. 13/364,163, filed Feb. 1, 2012.

Wikipedia, definition: "CAPTCHA," retrieved from https://en.wikipedia.org/wiki/Captcha, page last updated Sep. 29, 2016, 8 pages.

Wikipedia, definition: "Griefer," retrieved from https://en.wikipedia.org/wiki/Griefer, page last updated Sep. 4, 2016, 5 pages.

Wikipedia, definition: "Virtual world," retrieved from https://en.wikipedia.org/wiki/Virtual_world, page last updated Sep. 7, 2016, 16 pages.

Office Action from Japanese Application No. 2013-008496, dated Nov. 22, 2016.

\* cited by examiner

VIRTUAL AVATAR AUTHENTICATION

RELATED APPLICATIONS

This application is a continuation of U.S. patent application Ser. No. 13/364,163, filed Feb. 1, 2012, which is herein incorporated by reference.

BACKGROUND

The present invention relates to virtual worlds, and in particular to methods and systems for authenticating that an avatar in a virtual world is a computer-driven avatar.

In the context of virtual worlds, both people and software agents may be represented as avatars. Avatars may include any type of recognizable, identifying information, but in typical applications, avatars usually comprise an image. Furthermore, this image may be as simple as a two-dimensional icon, and as complex as a detailed three-dimensional image, for example a detailed rendering of a human or humanoid. On particularly notable and exemplary conventional virtual world is Second Life, where avatars comprising a three-dimensional computer-generated image of a human represent human-controlled and software-controlled entities alike.

One recognized problem prevalent in typical virtual worlds such as Second Life is the existence and activity of entities determined to disrupt the virtual world operation and/or the activities of other users populating the virtual world. These entities are conventionally known as "griefers," and the consequences of griefers' activities are conventionally known as "griefing." Griefing is a significant problem to virtual world management, and is a primary contributor to customer dissatisfaction. Indeed, as much as 25% of customer support communications deal specifically with griefing.

Activity similar to griefing is not limited to virtual worlds. Indeed, many online resources have experienced adverse consequences resulting from the operation of human and/or software entities designed to compromise resource integrity and (typically) access protected information, such as financial information. Typical examples of such conventional software entities are web-crawlers, phishing programs, worms, Trojan-horses, and etc.

Often, a typical virtual world griefer is a software entity created by a human user populating the virtual world. Those familiar with typical virtual worlds recognize these software entities as "bots." In an attempt to control and reduce griefing, typical approaches have relied on authentication technologies capable of distinguishing human-controlled entities from software-controlled entities. In particular, typical authentication systems and methods focus on verifying that an avatar in a virtual world is controlled by a human by utilizing a challenge-response test.

The exemplary conventional authentication system is CAPTCHA, sometimes described as a "reverse-Turing test." CAPTCHA (and other typical authentication systems) typically presents an entity seeking access to an online resource with a challenge that may not be solved by a machine. For example, a common variety of CAPTCHA authentication includes presenting an entity seeking access with a distorted image comprising letters and/or numbers. The entity is required to reproduce the distorted letters and/or numbers from the image into a text field. Other common varieties of CAPTCHA authentication include presenting an entity seeking access with an auditory stimulus, such as a recording of a human voice speaking a short phrase. The entity is required to reproduce the text of the short phrase into a text field. The essential element of all conventional authentication systems is presenting a challenge, such as those described above, that a machine is incapable of satisfying, or at least a challenge that a machine performs with significantly less accuracy than a human.

CAPTCHA technology, as well as other conventional authentication systems, are highly effective in the intended context of determining whether an entity seeking access to a resource is controlled by a human. However, these conventional approaches are not capable of verifying the reverse proposition: namely that a particular entity seeking access to a resource is controlled by a machine. This leaves open many opportunities for a human-controlled entity to gain unauthorized access to resources, especially to resources intended to be accessed only by machine-controlled entities.

Since the advent of conventional authentication techniques such as CAPTCHA, machine-controlled entities have experienced significantly less success in gaining unauthorized access to resources protected by authentication. Accordingly, entities seeking unauthorized access may be increasingly represented not by machine-control, but rather by human control. Thus, there is a need in the art to provide a system, method, and computer program product capable of authenticating that an entity seeking access to a resource is a machine-controlled entity in order to provide resource security against unauthorized access by human-controlled entities.

BRIEF SUMMARY

In one general embodiment, a method for determining a controlling entity of a first avatar in a virtual world includes: receiving a request for access to a resource via a first avatar; providing a challenge to the first avatar in response to receiving the request; receiving a challenge response via the first avatar in response to the challenge; determining an identity confidence level based on the challenge response; making an identity determination for a controlling entity of the first avatar based on the identity confidence level; and providing or denying access to the resource based on the identity determination.

In another general embodiment, a system for determining a controlling entity of a first avatar in a virtual world includes a processor and logic configured to cause the processor to: receive a request for access to a resource via a first avatar; provide a challenge to the first avatar in response to receiving the request; receive a challenge response via the first avatar in response to the challenge; determine an identity confidence level based on the challenge response; make an identity determination for a controlling entity of the first avatar based on the identity confidence level; and either provide or deny access to the resource based on the identity determination.

In another general embodiment, a computer program product includes a computer readable storage medium having computer readable program code embodied therewith. The computer readable program code includes program instructions embodied therewith, the program instruction executable by a processor to cause the processor to: receive a request for access to a resource via a first avatar; provide a challenge to the first avatar in response to receiving the request; receive a challenge response via the first avatar in response to the challenge; determine an identity confidence level based on the challenge response; make an identity determination for a controlling entity of the first avatar based on the identity confidence level; and either provide or deny access to the resource based on the identity determination.

Other aspects and embodiments of the present invention will become apparent from the following detailed description, which, when taken in conjunction with the drawings, illustrate by way of example the principles of the invention.

DETAILED DESCRIPTION

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The following description discloses several preferred embodiments of systems, methods and computer program products for determining a type of an entity controlling an avatar in a virtual world, among other embodiments.

In one general embodiment, a method for determining a controlling entity of a first avatar in a virtual world includes: receiving a request for access to a resource via a first avatar; providing a challenge to the first avatar in response to receiving the request; receiving a challenge response via the first avatar in response to the challenge; determining an identity confidence level based on the challenge response; making an identity determination for a controlling entity of the first avatar based on the identity confidence level; and providing or denying access to the resource based on the identity determination.

In another general embodiment, a system for determining a controlling entity of a first avatar in a virtual world includes a processor and logic configured to cause the processor to: receive a request for access to a resource via a first avatar; provide a challenge to the first avatar in response to receiving the request; receive a challenge response via the first avatar in response to the challenge; determine an identity confidence level based on the challenge response; make an identity determination for a controlling entity of the first avatar based on the identity confidence level; and either provide or deny access to the resource based on the identity determination.

In another general embodiment, a computer program product includes a computer readable storage medium having computer readable program code embodied therewith. The computer readable program code includes computer readable program code configured to cause a processor to: receive a request for access to a resource via a first avatar; provide a challenge to the first avatar in response to receiving the request; receive a challenge response via the first avatar in response to the challenge; determine an identity confidence level based on the challenge response; make an identity determination for a controlling entity of the first avatar based on the identity confidence level; and either provide or deny access to the resource based on the identity determination.

Some embodiments of the present invention can take the form of a service that may include steps performed by humans, machines, or both.

Some embodiments of the present invention can take the form of an entirely hardware embodiment, other embodiments of the invention can take the form of an entirely software embodiment or an embodiment containing both hardware and software elements. In one embodiment, the invention is implemented in software, which includes but is not limited to firmware, resident software, microcode, etc.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as "logic", a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a non-transitory computer readable storage medium. A non-transitory computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the non-transitory computer readable storage medium include the following: a portable computer diskette, a hard disk, a random access memory (RAM), a read-only memory (ROM), an erasable programmable read-only memory (EPROM or Flash memory), a portable compact disc read-only memory (e.g., CD-ROM), a Blu-ray disc read-only memory (BD-ROM), an optical storage device, a magnetic storage device, or any suitable combination of the foregoing. In the context of this document, a non-transitory computer readable storage medium may be any tangible medium that is capable of containing, or storing a program or application for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 1:
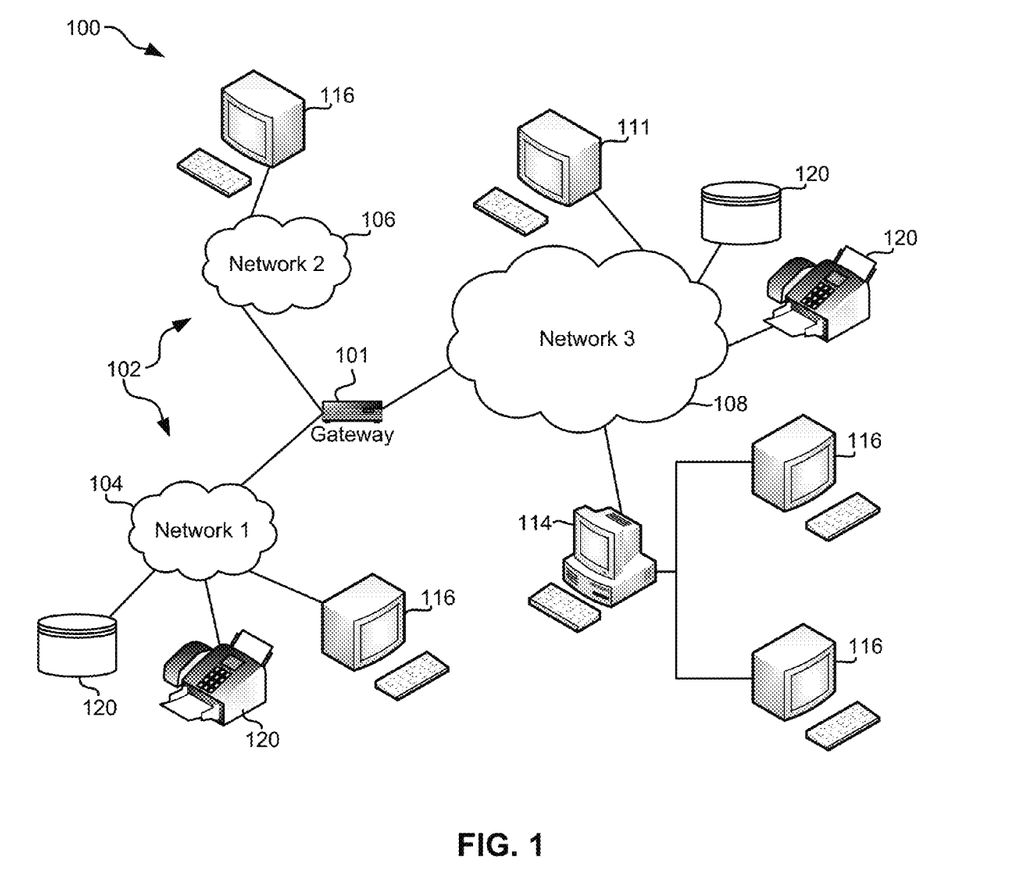
FIG. 1 illustrates a network architecture, in accordance with one embodiment.

FIG. 1 illustrates a network architecture 100, in accordance with one embodiment. As shown in FIG. 1, a plurality of remote networks 102 are provided including a first remote network 104 and a second remote network 106. A gateway 101 may be coupled between the remote networks 102 and a proximate network 108. In the context of the present network architecture 100, the networks 104, 106 may each take any form including, but not limited to a LAN, a WAN such as the Internet, PSTN, internal telephone network, etc.

In use, the gateway 101 serves as an entrance point from the remote networks 102 to the proximate network 108. As such, the gateway 101 may function as a router, which is capable of directing a given packet of data that arrives at the gateway 101, and a switch, which furnishes the actual path in and out of the gateway 101 for a given packet.

Further included is at least one data server 114 coupled to the proximate network 108, and which is accessible from the remote networks 102 via the gateway 101. It should be noted that the data server(s) 114 may include any type of computing device/groupware. Coupled to each data server 114 is a plurality of user devices 116. Such user devices 116 may include a desktop computer, lap-top computer, hand-held computer, printer or any other type of logic. It should be noted that a user device 111 may also be directly coupled to any of the networks, in one embodiment.

A peripheral 120 or series of peripherals 120, e.g., facsimile machines, printers, networked and/or local storage units or systems, etc., may be coupled to one or more of the networks 104, 106, 108. It should be noted that databases and/or additional components may be utilized with, or integrated into, any type of network element coupled to the networks 104, 106, 108. In the context of the present description, a network element may refer to any component of a network.

According to some approaches, methods and systems described herein may be implemented with and/or on virtual systems and/or systems which emulate one or more other systems, such as a UNIX system which emulates an IBM z/OS environment, a UNIX system which virtually hosts a MICROSOFT WINDOWS environment, a MICROSOFT WINDOWS system which emulates an IBM z/OS environment, etc. This virtualization and/or emulation may be enhanced through the use of VMWARE software, in some embodiments.

In more approaches, one or more networks 104, 106, 108, may represent a cluster of systems commonly referred to as a "cloud." In cloud computing, shared resources, such as processing power, peripherals, software, data, servers, etc., are provided to any system in the cloud in an on-demand relationship, thereby allowing access and distribution of services across many computing systems. Cloud computing typically involves an Internet connection between the systems operating in the cloud, but other techniques of connecting the systems may also be used.

Figure 2:
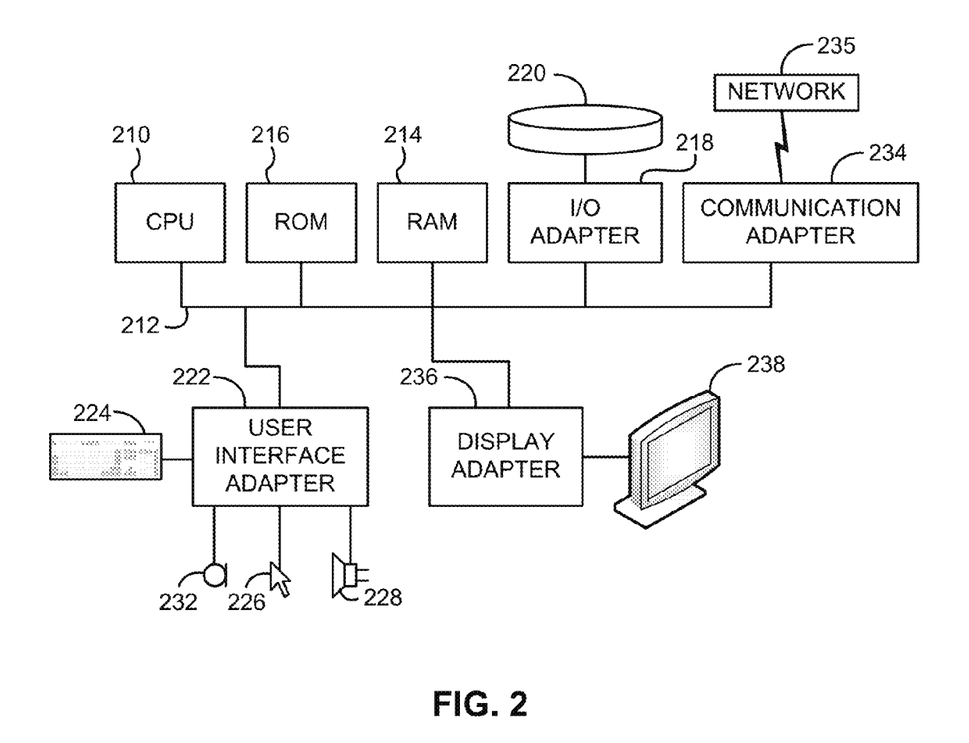
FIG. 2 shows a representative hardware environment that may be associated with the servers and/or clients of FIG. 1, in accordance with one embodiment.

FIG. 2 shows a representative hardware environment associated with a user device 116 and/or server 114 of FIG. 1, in accordance with one embodiment. Such figure illustrates a typical hardware configuration of a workstation having a central processing unit 210, such as a microprocessor, and a number of other units interconnected via a system bus 212.

The workstation shown in FIG. 2 includes a Random Access Memory (RAM) 214, Read Only Memory (ROM) 216, an I/O adapter 218 for connecting peripheral devices such as disk storage units 220 to the bus 212, a user interface adapter 222 for connecting a keyboard 224, a mouse 226, a speaker 228, a microphone 232, and/or other user interface devices such as a touch screen and a digital camera (not shown) to the bus 212, communication adapter 234 for connecting the workstation to a communication network 235 (e.g., a data processing network) and a display adapter 236 for connecting the bus 212 to a display device 238.

The workstation may have resident thereon an operating system such as a MICROSOFT WINDOWS Operating System (OS), a MAC OS, a UNIX OS, etc. It will be appreciated that a preferred embodiment may also be implemented on platforms and operating systems other than those mentioned. A preferred embodiment may be written using JAVA, XML, C, and/or C++language, or other programming languages, along with an object oriented programming methodology. Object oriented programming (OOP), which has become increasingly used to develop complex applications, may be used.

Figure 3:
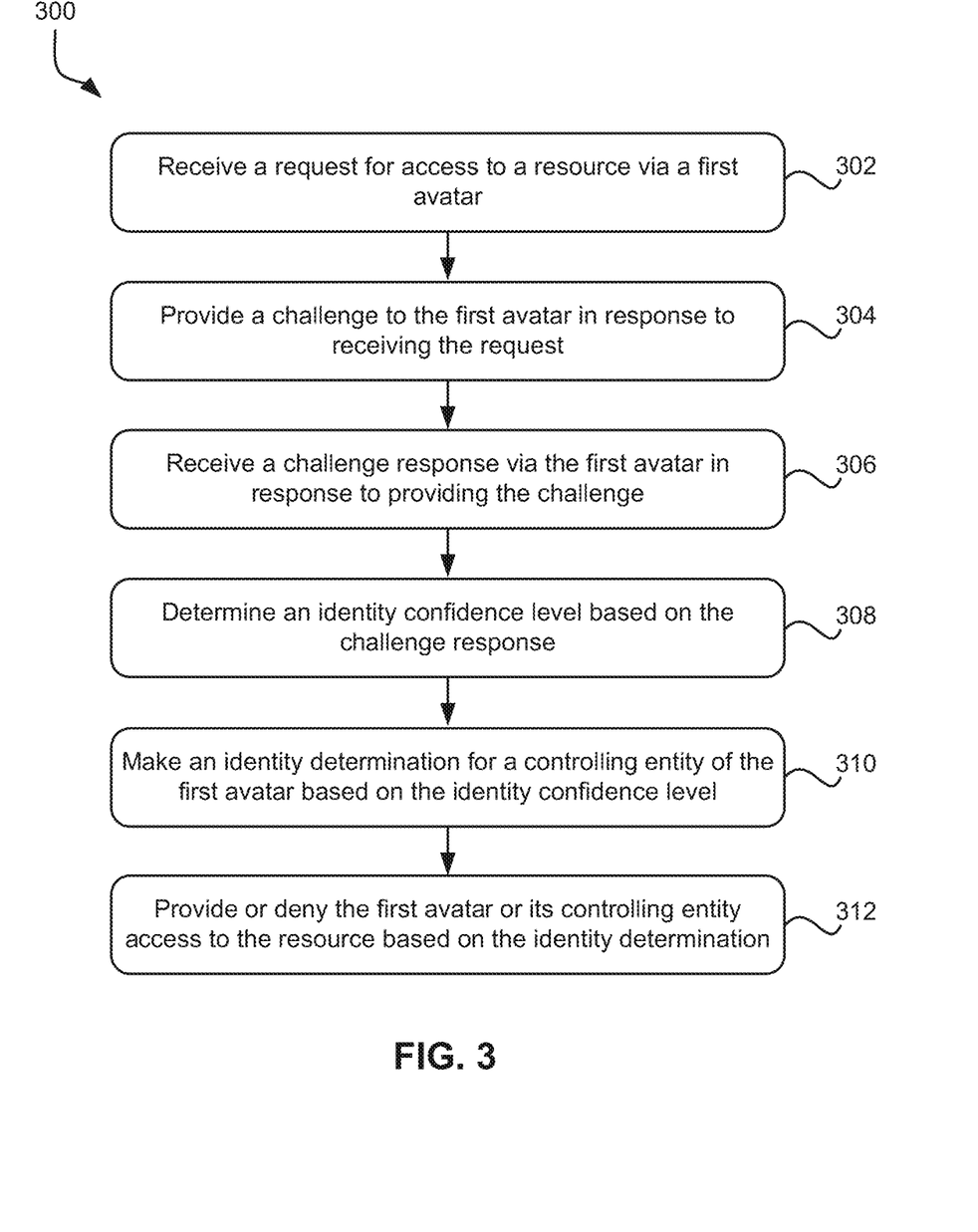
FIG. 3 is a flow diagram of a process according to one embodiment.

Referring now to FIG. 3, a flowchart of a method 300 is shown, according to one embodiment. As will be appreciated by one having ordinary skill in the art, the method 300 may be performed in any environment, including those shown in FIGS. 1-2, among others.

In one embodiment, method 300 may include a first operation 302, where, in the context of a virtual world, a request for access to a resource is received via a first avatar. As understood herein, the request may take many forms and may originate from one or more of a plurality of sources, in various approaches. For example, in one embodiment the request may originate from an entity controlling the first avatar, even though the request is received via the avatar. As will be understood by one having ordinary skill in the art, the entity controlling the avatar may be a human entity or a nonhuman entity, such as a machine, one or more software routines, etc. in various approaches.

Moreover, the request for access to a resource may take many forms, according to one embodiment. For example, requesting access to a resource may include one or more of the following exemplary actions, such as the avatar performing a gesture or communicating a message such as a textual message, an auditory indicator, and/or a visual indicator, and/or the entity controlling the avatar inputting a keystroke; a mouse click, and/or other interaction with a input/output interface, etc. as would be understood by one having ordinary skill in the art upon reading the present descriptions.

As will be understood by one having ordinary skill in the art upon reading the present descriptions, in the context of a virtual world a resource may include any resource, such as a banking function, a help function, an administrative function, etc. associated with the virtual universe. In particular, the present descriptions are directed toward resources that are nonhuman-driven, but of course the scope of the invention disclosed herein contemplates and includes resources driven by a human, and particularly includes functionalities for distinguishing between the controlling entity of a variety of resources, regardless of whether a given resource is intended to be nonhuman-driven or human-driven, and whether the given resource is actually nonhuman-driven or human-driven.

In another embodiment, method 300 may further include operation 304, where, in response to receiving the request for access to a resource via a first avatar, a challenge is provided to the first avatar. As will be understood by the skilled artisan reading the present description, a "challenge" may include one or more challenge tasks. Moreover, challenge tasks may be presented in any manner, with several exemplary presentations described immediately below.

In one embodiment, a challenge task may be in a predetermined manner. For example, a predetermined challenge may be automatically presented upon receiving a request for access to a given resource. In another related approach, a predetermined challenge may be automatically presented upon a particular avatar requesting access to a given resource, or upon a particular type of avatar requesting access to a given resource, etc. Of course, other predetermined challenge presentations may be included, as would be understood by one having ordinary skill in the art upon reading the present descriptions.

In addition and/or alternatively, challenges may be presented dynamically. For example, in one embodiment a challenge may include a plurality of challenge tasks. In one embodiment, the plurality of challenge tasks may further represent challenges of different difficulty levels, and challenge tasks may be presented in a series according to order of ascending or descending difficulty, in one approach. In a further refined approach, a first challenge task from the plurality of challenge tasks may be presented at random, and subsequent challenge task(s) may be presented based on the response to the challenge task received from the avatar requesting access to the resource. For example, if an avatar responds to a challenge task correctly and/or with a quick response time, a subsequent challenge task may be presented with lower difficulty than the previous challenge task. Alternatively, the subsequent challenge task of higher difficulty may be presented upon receiving a quick and/or correct challenge response from the avatar. As will be understood by one having ordinary skill in the art upon reading the present descriptions, challenge tasks may be presented according to any criteria, and may be further presented in any order, in various approaches.

Regardless of the manner in which one or more challenge tasks are presented, in various approaches providing the challenge to the first avatar may take may forms. For example, in one embodiment providing the challenge to the first avatar may include requiring the avatar to perform one or more tasks, such as requiring the avatar to solve a complex arithmetic problem, requiring the avatar to perform a vector operation; requiring the avatar to complete a logical sequence; requiring the avatar to encrypt a message; and requiring the avatar to decrypt an encrypted message, etc. as would be understood by one having ordinary skill in the art upon reading the present descriptions.

In yet another embodiment, method 300 may further include operation 306, where, in response to the challenge, a challenge response is received via the avatar.

In the context of the present descriptions, a challenge response may include multiple components and/or operations, in various approaches. In one particular approach, a challenge response may include a textual response, such as numbers and/or letters indicating a solution to a challenge task. In another approach, a challenge response may include displaying a visual indicator, such as a color, a gesture, an image, etc. as would be understood by those having ordinary skill in the art upon reading the present descriptions. Of course, challenge responses may include a plurality of any type of response as listed herein and as will be understood by one having ordinary skill in the art upon reading the present descriptions.

In other approaches, the challenge response may additionally and/or alternatively include a response time, representing the amount of time passed while the entity controlling the avatar solves and responds to the challenge. As will be understood by the skilled artisan reading the present descriptions, response time may be measured in a variety of manners, such as a response time measured from the instant a challenge is provided to the avatar until the instant a challenge response is received from the avatar. In another approach response time may be measured from the instant a challenge is received by the avatar until the instant a challenge response is transmitted by the avatar. Of course, other time points may represent the boundaries of "response time" as described herein and as will be appreciated by the person of ordinary skill in the art upon reading the present descriptions.

In still yet another embodiment, method 300 may further include operation 308, where an identity confidence level is determined based on the challenge response. As described herein, an identity confidence level may be embodied in a variety of measures, such as a percentage in some approaches and a multidimensional vector in other approaches. Moreover, in cases employing a multidimensional vector as an identity confidence level, the vector dimensions may represent a multiplicity of characteristics, such as risk, risk based on historical information (e.g. regarding the frequency and/or likelihood that a "griefer" attempts to access a particular resource), avatar location, resource importance, and etc. as will be understood by one having ordinary skill in the art upon reading the present descriptions.

Moreover, and as will be understood by the skilled artisan reading the present descriptions, the identity confidence level may be determined according to a variety of approaches, with several non-limiting exemplary approaches described immediately below.

For example, in one approach determining the identity confidence level based on the challenge response includes evaluating one or more challenge response criteria, such as one or more challenge response times, challenge response accuracies, challenge response locations, challenge response formats, etc. as would be understood by one having ordinary skill in the art upon reading the present descriptions.

In another approach determining identity confidence level may additionally and/or alternatively include evaluating additional criteria, such as avatar user context; avatar confidence votes; and avatar IP address, etc. as would be understood by one having ordinary skill in the art upon reading the present descriptions.

Alternatively and/or additionally, in various approaches determining identity confidence level may involve correlating challenge response characteristics with one another, and/or correlating challenge response characteristics with other characteristics, such as expected challenge response characteristics in one preferred embodiment.

In one particular embodiment including correlation to determine an identity confidence level, determining the identity confidence level specifically includes calculating a first correlation between a challenge response and an expected challenge response. Furthermore, calculating the first correlation may include correlating one or more challenge response characteristics with corresponding expected challenge response characteristics, such as correlating a challenge response accuracy and an expected challenge response accuracy; and/or correlating a challenge response time and an expected response time, in some approaches.

Moreover, in some embodiments this correlation may improve the ability to accurately indicate controlling entity identity by comparing the correlation to a correlation threshold indicating confidence that an avatar of interest is controlled by a given entity type. Accordingly, in some embodiments it is further advantageous to calculate a first difference between the first correlation and a first correlation threshold, where the threshold indicates a boundary, e.g. between high-confidence identity determinations and low-confidence identity determinations.

Furthermore, identity confidence level determination may be accomplished by utilizing additional and/or alternative approaches. For example, in one approach determining the identity confidence level may include utilizing matched filters. In particular, this approach includes generating a matched filter for one or more expected avatar responses, and calculating a convoluted challenge response using the matched filter.

In order to further improve identity confidence level determinations, the convoluted challenge response may be correlated with the challenge response and/or with an expected convoluted challenge response, and this correlation may be compared against a threshold indicating either improved or degraded confidence in a particular controlling entity identity determination, in one approach.

In one particularly preferred embodiment utilizing matched filters and/or correlations to determine the identity confidence level, a correlation module calculates a cross-correlation $CC(x,y)$ between an image of the received challenge response (e.g. gesture) $rg(x,y)$ and a matched filter which represents an impulse response $h(x,y)=eg^*(-x,-y)$ of an image of the expected challenge response (e.g. gesture), as shown in Eqn.[1], below.

$$CC(x,y)=\iint rg(\xi,\eta)eg^*(\xi-x, \eta-y)]d\xi d\eta \quad \text{Eqn.[1]}$$

As can be seen from the relationship shown above, Eqn.[1] comprises a double integral, meaning that, in one embodiment involving an image (e.g. of an avatar performing a gesture) the integration is over the X and Y axes directions of one image in the video stream. Additionally, $\xi$ is the integration variable along the X axis, $\eta$ is the integration variable along the Y axis, and "*" denotes a complex conjugate. Mathematically, $CC(x,y)$ may be expressed as a surface varying along the X axis and the Y axis, for each $(x,y)$. Accordingly, there may be one value of $CC(x,y)$ for each image pixel, in one approach.

In some approaches, The autocorrelation $ACeg(x,y)$ between the expected gesture $eg(x,y)$ and itself may be calculated as shown in Eqn.[2]. Similarly, the autocorrelation $ACrg(x,y)$ between the received gesture $rg(x,y)$ and itself may be calculated as shown in Eqn.[3].

$$ACeg(x,y)=\iint eg(\xi,\eta)eg^*(\xi-x, \eta-y)]d\xi d\eta \quad \text{Eqn.[2]}$$

$$ACrg(x,y)=\iint rg(\xi,\eta)eg^*(\xi-x, \eta-y)]d\xi d\eta \quad \text{Eqn.[3]}$$

The range of the ratio of $CC(x,y)/[\sqrt{ACeg(x,y)}ACrg(x,y)]$ for each $(x,y)$ is between $-1$ and $+1$, where $+1$ represents the ideal correlation of one hundred (100%). To maximize $CC(x,y)/[\sqrt{ACeg(x,y)}\sqrt{ACrg(x,y)}]$, the following difference surface, $Difference(x,y)$, is defined in Eqn.[4]. As shown above, $Difference(x,y)$ may be calculated by subtracting $CC(x,y)/[\sqrt{ACeg(x,y)}\sqrt{ACrg(x,y)}]$ from unity.

In a variety of approaches, $Difference(x,y)$ may be evaluated (a) point-to-point, (b) as an arithmetic mean, (c) as a geometric mean, and (d) as a root-mean-square. Difference $(x,y)$ ranges between 0 and $+2$, and the ideal difference for each value of $(x,y)$ is 0, meaning for a value of 0 that there is no difference between the received gesture $rg(x,y)$ and the expected gesture $eg(x,y)$ at point $(x,y)$.

Moreover, in other approaches $Difference(x,y)$ may be evaluated point-by-point in read difference calculations, but it may be advantageous to quantify surface $Difference(x,y)$ in terms of a single number, to simply read difference calculations. Values capable of being used in the read difference calculations may be represented by terms such as MAX_Difference which is equal to the maximum value of $Difference(x,y)$, AM_Difference, i.e. the arithmetic mean of the values of $Difference(x,y)$, GM_Difference, i.e. the geometric mean of the values of $Difference(x,y)$, and/or RMS_Difference, i.e. the root-mean-square of the values of $Difference(x,y)$.

$$Difference(x,y)=1-CC(x,y)/[\sqrt{ACeg(x,y)}\sqrt{ACrg(x,y)}] \quad \text{Eqn.[4]}$$

In this embodiment, one exemplary goal is to have, e.g. a $Difference(x,y)$ less than a threshold $Difference(x,y)$, where the difference between the $Difference(x,y)$ and the threshold $Difference(x,y)$ indicates a degree to which the received gesture is what was expected, meaning that the smaller the difference, the closer the received gesture is to what was expected, in a preferred approach.

In one embodiment, determining the identity confidence level in operation 308 may additionally include utilizing a crowdsourcing component. As will be appreciated by those having ordinary skill in the art, the crowdsoucing component may be particularly useful in assisting the virtual avatar authentication process by providing additional review of the authentication methodology, especially in close cases where an identity confidence level approaches an identity determination threshold, but is insufficient for an adequate determination. In such an approach, the crowdsourcing component may be queried for assistance in making the identity determination and/or determining the identity confidence level, in some approaches.

As will be appreciated by the skilled artisan, a crowdsourcing component may include a variety of resources. For example, the crowdsourcing component in one approach may include a predetermined panel of expert human users (e.g. users capable of making high-confidence determinations regarding the identity of a controlling entity of an avatar of interest). Expert human users may include system administrators monitoring a virtual avatar authentication process, in another approach. In still other approaches, the crowdsourcing component may include a combination of human and nonhuman elements. Of course, as will be understood by a person of ordinary skill in the art upon reading the present descriptions, the crowdsourcing component may include any composition and/or combination of elements capable of evaluating a challenge response and augmenting the identity confidence level determination as described herein.

For example, in one approach determining the identity confidence level based on the challenge response includes determining that the identity confidence level is less than a confidence threshold. As will be appreciated by the skilled artisan reading the present descriptions, the confidence threshold may represent a boundary between accurate identity confidence level determinations and relatively less accurate identity confidence level determinations, in one approach.

In one approach, after determining that the identity confidence level is less than the confidence threshold, the crowdsourcing component may be queried for an identity confidence level evaluation in order to augment confidence in the identity confidence level as determined based on the challenge response alone, in some approaches. Thus, querying of the crowdsourcing component may be initiated based at least in part on determining that the identity confidence level is less than a confidence threshold.

As described herein, the crowdsourcing component identity confidence level evaluation may include a variety of approaches to augmenting identity confidence level. In one particular approach, for example, evaluating an identity confidence level may include generating a summary of one or more of the challenge, the challenge response, the challenge context, etc. as would be understood by one having ordinary skill in the art. Upon compiling the summary, the summary may be provided to one or more crowdsourcing component constituents (e.g. system administrators, virtual avatar authentication monitors, etc. as would be understood by one having ordinary skill in the art) for evaluation. Based on each constituent's individual evaluation of the summary, a confidence vote may be cast, and confidence votes may be compiled to reflect an overall confidence vote regarding an identity confidence level evaluation by the crowdsourcing component. Moreover, in some approaches the identity confidence level may be altered based on the confidence vote, ultimately improving the confidence that a certain type of entity controls a particular avatar, in one embodiment.

Further still, after the crowdsourcing component has completed its evaluation, the ultimate identity determination may be based on the identity confidence level, as described above, and may be further based at least in part on the identity confidence level evaluation provided by the crowdsourcing component, in various approaches.

In other embodiments, instead of merely querying a crowdsourcing component when a confidence level falls below a certain threshold, a crowdsourcing component may additionally and/or alternatively be queried when it is determined that a correlation is less than a corresponding correlation threshold (e.g. a correlation between a challenge response and an expected challenge response as described above, a correlation between a convoluted challenge response and a challenge response, a correlation between a convoluted challenge response and an expected convoluted challenge response, etc. as would be understood by one having ordinary skill in the art upon reading the present descriptions). Accordingly, it will be understood that various embodiments of the crowdsourcing component may provide evaluation of any operation in the virtual avatar authentication process, particularly including operations where a comparison of actual response characteristics to reference data may inform an identity confidence level, an identity determination, a challenge response attribute, an avatar identity, and etc. as would be understood by one having ordinary skill in the art upon reading the present description.

Where the crowdsourcing component is queried regarding a correlation evaluation, the crowdsourcing component may engage in a slightly different analysis than when evaluating identity confidence level alone. In particular, the analysis may include receiving a correlation evaluation from the crowdsourcing component (e.g. receiving a correlation altered by the crowdsourcing component based on one or more confidence votes, in one approach) and calculating a second correlation based on the correlation evaluation (e.g. calculating the correlation between the first correlation and the expected first correlation, in another approach). Moreover, the analysis may further include calculating a second difference between the second correlation and a second correlation threshold; and modifying the identity confidence level based on the second difference, in various approaches.

Regardless of the reason for querying the crowdsoucing component, the query itself may take any suitable form, such as an email, a tweet, a signal, a post to a bulletin board, etc. as will be understood by one having ordinary skill in the art upon reading the present descriptions.

Once an identity confidence level has been determined, in some approaches the virtual avatar authentication process may include indicating the identity confidence level (e.g., to the first avatar, to the controlling entity, etc., as would be understood by the skilled artisan reading the present descriptions). As described herein, indicating the identity confidence level may take any suitable form, such as displaying a message in the virtual world (e.g. a textual message, a spoken message, a symbolic message, etc.); outputting an auditory indicator (such as a beep, a tone, a series of beeps and/or tones, a song, a voice, etc.); and/or displaying a visual indicator in the virtual world. Of course, as would be understood by one having ordinary skill in the art upon reading the present descriptions, indicating the identity confidence level may include additional and/or alternative methods of indication to those specifically listed above.

With specific reference to displaying a visual indicator to the avatar, visual indicators may take any suitable form, such as displaying a still image to the first avatar; displaying a sequence of images to the first avatar; altering an appearance of at least one of the first avatar and a second avatar (e.g. changing the color of an avatar's exterior, flashing a sequence of colors, changing a size of an avatar, etc. as will be understood by one having ordinary skill in the art; performing a gesture by at least one of the first avatar and the second avatar (e.g. a handshake, a series of handshakes, a series of motions, etc.); and providing a virtual world inventory item to the first avatar.

In one particular embodiment, method 300 may further include operation 310, where an identity determination for a controlling entity of the first avatar is made based on the identity confidence level. As will be appreciated by the skilled artisan upon reading the present descriptions, the identity determination may be made in a positive manner and/or in a negative manner, as described below according to several non-limiting exemplary embodiments.

For example, in one embodiment an identity determination may be embodied as a positive determination that an entity controlling an avatar is a particular type of entity, such as a human entity, a software entity, a machine entity, etc. as will be understood by a person of skill in the art reading the present descriptions.

Moreover, an identity determination may be embodied as a negative determination that an entity controlling an avatar is not a particular type of entity, i.e. that the controlling entity is not a human entity, that the controlling entity is not a machine controlled entity, that the controlling entity is not a software entity, etc as will be appreciated by the skilled artisan reading the present descriptions.

Of course, as will be appreciated by one having ordinary skill in the art, positive and/or negative determinations may be combined in any manner to make an overall identity determination, or may be used in complementary fashion without necessarily combining the determinations into a single determination. For example, an identity determination may rely on an identity confidence level indicating approximately 80% confidence that an avatar is controlled by a nonhuman entity in combination with an identity confidence level indicating approximately 15% confidence that an avatar is controlled by a human entity to ultimately determine that the controlling entity of this particular avatar is identified as nonhuman, in one embodiment.

Moreover, it will be apparent to the skilled artisan reading the present descriptions that an identity determination may require different criteria when regarding different resources to which an avatar is requesting access. For example, in a virtual world many resources exist. Moreover, resources may be further categorized according to many criteria, such as resource type, resource security, resource importance, resource access frequency, etc. as would be understood by one having ordinary skill in the art. In a variety of approaches, an identity determination regarding a resource of a given type, security, importance, etc. may require a different identity confidence level to make an identity determination than an identity determination regarding a different resource type, security, importance, etc.

In one specific non-limiting example, a high-security resource may require a high identity confidence level (e.g. 90-95%, in one embodiment) to make an identity determination, where a relatively low security resource may require a relatively lower identity confidence level (e.g. 75-80%, in one embodiment) to make an identity determination. Similarly, a low-access frequency resource may require a higher identity confidence level to make an identity determination than a high-access frequency resource. Advantages of a flexible identity confidence level requirement for diverse identity determinations include the ability to reduce processing time and load for certain resources, e.g. those requiring frequent access or of low security concern. In this manner, identity confidence level requirements may be tailored according to the individual needs of any given virtual world, according to the criteria mentioned above, among other similar criteria, as would be understood by the skilled artisan reading the present descriptions.

Further still, more embodiments of the inventive method 300 may include functionality enabling ease and/or speed of access to an avatar that has consistently demonstrated a particular controlling entity identity. In this manner, redundant and computationally intensive challenges may be avoided where deemed unnecessary, for example according to prior performance.

In one such embodiment, one or more identity determinations and/or identity confidence levels over a plurality of challenge tasks and/or challenges may be stored in an attribute, such as an avatar challenge performance attribute. Moreover, the avatar challenge performance attribute may be evaluated and an avatar identity may be assigned where the evaluation indicates, for example, that the entity controlling the avatar has consistently demonstrated that is a particular type of entity, such as a nonhuman entity. Preferably, the avatar identity would automatically indicate that the entity is of that particular type upon being presented with subsequent challenges, thereby relieving the entity from performing excessive and/or redundant challenges. As will be appreciated by those having ordinary skill in the art, the avatar identity may indicate the controlling entity's identity for a predetermined duration, such as a number of days, weeks, months, etc. and/or a number of challenges, challenge tasks, etc. according to various approaches. In one particular approach, the avatar identity may permanently indicate that an avatar is controlled by an entity of a particular identity.

In one embodiment, method 300 may further include operation 312, where access to the resource is either provided or denied, based on the identity determination.

For example, in a preferred embodiment access is provided when the identity determination indicates that the controlling entity is non-human. Specifically, access is provided to the avatar or its controlling entity when the identity determination indicates that the controlling entity is non-human. Of course, access may alternatively be denied upon the identity determination indicating that the controlling entity is human, in other embodiments. One having ordinary skill in the art will appreciate that the above examples indicate an ability to provide or deny access using either a positive identification approach that indicates a controlling entity is of a specified type, or alternatively using a negative identification that indicates a controlling entity is not of a specified type, in various approaches.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A computer-implemented method for determining a controlling entity of a first avatar in a virtual world, the method comprising:

receiving, via the computer, a request for access to a resource via a first avatar;

providing, by the computer, a challenge to the first avatar in response to receiving the request;

receiving, via the computer, a challenge response via the first avatar in response to the challenge;

determining, by the computer, an identity confidence level based on the challenge response, wherein the identity confidence level is a numerical value determined based at least in part on a cross-correlation between an image and a matched filter;

calculating a difference between the cross-correlation and an autocorrelation;

making, by the computer, an identity determination for a controlling entity of the first avatar based on the identity confidence level; and providing or denying, by the computer, access to the resource based on the identity determination.

2. The method as recited in claim 1, wherein determining the identity confidence level based on the challenge response comprises:

determining that the identity confidence level is less than a confidence threshold;

querying a crowdsourcing component for an identity confidence level evaluation; and receiving the identity confidence level evaluation from the crowdsourcing component; and wherein the making an identity determination is further based at least in part on the identity confidence level evaluation.

3. The method as recited in claim 1, wherein the determining the identity confidence level comprises:

calculating a first correlation between the challenge response and an expected challenge response, wherein the first correlation corresponds to the identity confidence level; and calculating a first difference between the first correlation and a first correlation threshold;

wherein calculating the first correlation comprises correlating at least one of:

a challenge response accuracy and an expected challenge response accuracy; and a challenge response time and an expected response time.

4. The method as recited in claim 3, further comprising:

determining that the first correlation is less than the first correlation threshold;

querying a crowdsourcing component for a first correlation evaluation;

receiving a first correlation evaluation from the crowdsourcing component;

calculating a second correlation based on the first correlation evaluation;

calculating a second difference between the second correlation and a second correlation threshold; and modifying the identity confidence level based on the second difference.

5. The method as recited in claim 1, wherein the determining the identity confidence level comprises:

generating a matched filter for one or more expected first avatar responses;

calculating a convoluted challenge response using the matched filter;

calculating a third correlation between the convoluted challenge response and the challenge response;

calculating a difference between the third correlation and a third correlation threshold; and calculating the identity confidence level based on the third correlation.

6. The method as recited in claim 1, wherein the identity confidence level comprises a correlation measure having a value on a continuous scale having a range from −1 to +1.

7. The method as recited in claim 1, wherein the determining the identity confidence level based on the challenge response comprises at least one of:

evaluating one or more challenge response times;
evaluating one or more challenge response accuracies;
evaluating a first avatar user context;
evaluating one or more first avatar confidence votes; and
evaluating a first avatar IP address.

8. The method as recited in claim 1, wherein the access is provided when the identity determination indicates that the controlling entity is non-human.

9. The method as recited in claim 1, wherein the numerical value is a value on a continuous scale having a range from −1 to +1, the continuous scale including a plurality of discrete increments between −1 and +1.

10. The method as recited in claim 9, further comprising indicating the identity confidence level, wherein indicating the identity confidence level comprises at least one of:

displaying a textual message in the virtual world;
outputting an auditory indicator; and
displaying a visual indicator in the virtual world, wherein displaying the visual indicator to the first avatar comprises at least one of:

displaying a still image to the first avatar;
displaying a video to the first avatar;
altering an appearance of at least one of the first avatar and a second avatar;
performing a gesture by the second avatar; and
providing a virtual world inventory item to the first avatar.

11. The method as recited in claim 1, further comprising:

storing at least one of the identity determination and the identity confidence level in a first avatar challenge performance attribute comprising:
one or more identity confidence levels; and
one or more identity determinations; and evaluating the first avatar challenge performance attribute; and assigning a first avatar identity based on the evaluation, wherein the first avatar identity permanently indicates that the first avatar is controlled by either one of: a human and a machine.

12. The method as recited in claim 1, wherein the request for access to a resource comprises at least one of:

a gesture performed by the first avatar;
a keystroke performed by entity controlling the first avatar;
a textual message communicated via the first avatar;
an auditory indicator communicated via the first avatar; and
a visual indicator communicated via the first avatar.

13. The method as recited in claim 1, further comprising:

indicating the identity confidence level;
storing at least one of the identity determination and the identity confidence level in a first avatar challenge performance attribute comprising:
one or more identity confidence levels; and
one or more identity determinations; and evaluating the first avatar challenge performance attribute; and assigning a first avatar identity based on the evaluation, wherein the first avatar identity permanently indicates that the first avatar is controlled by either one of: a human and a machine, wherein determining the identity confidence level based on the challenge response comprises:
  determining that the identity confidence level is less than a confidence threshold;
  querying a crowdsourcing component for an identity confidence level evaluation; and
  receiving the identity confidence level evaluation from the crowdsourcing component, and wherein the making an identity determination is further based at least in part on the identity confidence level evaluation, wherein indicating the identity confidence level comprises at least one of:
  displaying a textual message in the virtual world;
  outputting an auditory indicator; and
  displaying a visual indicator in the virtual world, and wherein displaying the visual indicator to the first avatar comprises at least one of:
  displaying a still image to the first avatar;
  displaying a video to the first avatar;
  altering an appearance of at least one of the first avatar and a second avatar;
  performing a gesture by the second avatar; and
  providing a virtual world inventory item to the first avatar, and wherein the request for access to a resource comprises at least one of:
  a gesture performed by the first avatar;
  a keystroke performed by entity controlling the first avatar;
  a textual message communicated via the first avatar;
  an auditory indicator communicated via the first avatar; and
  a visual indicator communicated via the first avatar, and wherein the determining the identity confidence level comprises:
  calculating a first correlation between the challenge response and an expected challenge response, the calculating the first correlation comprising correlating at least one of:
    a challenge response accuracy and an expected challenge response accuracy; and
    a challenge response time and an expected response time; and
  calculating a first difference between the first correlation and a first correlation threshold;
  determining that the first correlation is less than the first correlation threshold;
  querying a crowdsourcing component for a first correlation evaluation;
  receiving a first correlation evaluation from the crowdsourcing component;
  calculating a second correlation based on the first correlation evaluation;
  calculating a second difference between the second correlation and a second correlation threshold; and
  modifying the identity confidence level based on the second difference.

14. A system for determining a controlling entity of a first avatar in a virtual world, the system comprising a hardware processor and logic configured to cause the hardware processor to:
  receive, at the hardware processor, a request for access to a resource via a first avatar;
  provide, by the hardware processor, a challenge to the first avatar in response to receiving the request;
  receive, at the hardware processor, a challenge response via the first avatar in response to the challenge;
  determine, using the hardware processor, an identity confidence level based on the challenge response, wherein the identity confidence level is a numerical value on a continuous scale having a range from 0 to 1, the continuous scale including a plurality of discrete increments between 0 and 1, and wherein the identity confidence level is determined based at least in part on a cross-correlation between an image and a matched filter;
  calculate, using the hardware processor, a difference between the cross-correlation and an autocorrelation;
  make, using the hardware processor, an identity determination for a controlling entity of the first avatar based on the identity confidence level; and
  either provide or deny, using the hardware processor, access to the resource based on the identity determination.

15. The system as recited in claim 14, wherein the request for access to a resource comprises at least one of:
  a gesture performed by the first avatar;
  a keystroke performed by entity controlling the first avatar;
  a textual message communicated via the first avatar;
  an auditory indicator communicated via the first avatar; and
  a visual indicator communicated via the first avatar.

16. The system as recited in claim 14, wherein the identity confidence level is expressed as a percentage.

17. A computer program product, the computer program product comprising a non-transitory computer readable storage medium having computer readable program code embodied therewith, the computer readable program code comprising computer readable program code configured to cause a processor to:
  receive a request for access to a resource via a first avatar;
  provide a challenge to the first avatar in response to receiving the request;
  receive a challenge response via the first avatar in response to the challenge;
  determine an identity confidence level based on the challenge response, wherein the identity confidence level comprises a multidimensional vector, and wherein the multidimensional vector represents a plurality of characteristics selected from a group consisting of: a risk of providing a controlling entity of the first avatar access to the resource, a location of the first avatar, and an importance of the resource;
  make an identity determination for the controlling entity of the first avatar based on the identity confidence level; and
  either provide or deny access to the resource based on the identity determination.

18. The computer program product as recited in claim 17, wherein the request for access to a resource comprises at least one of:
  a gesture performed by the first avatar;
  a keystroke performed by entity controlling the first avatar;
  a textual message communicated via the first avatar;
  an auditory indicator communicated via the first avatar; and
  a visual indicator communicated via the first avatar.

19. The computer program product as recited in claim 17, wherein the identity confidence level is determined based at least in part on a cross-correlation between an image and a matched filter.

20. The computer program product as recited in claim 19, comprising computer readable program code configured to cause the processor to calculate a difference between the cross-correlation and an autocorrelation.

* * * * *